(12) United States Patent
Hofmann et al.

(10) Patent No.: US 6,230,496 B1
(45) Date of Patent: May 15, 2001

(54) ENERGY MANAGEMENT SYSTEM FOR HYBRID ELECTRIC VEHICLES

(75) Inventors: Lee Gregor Hofmann, Binghamton; William Anders Peterson, Vestal; Garey George Roden, Appalachin, all of NY (US)

(73) Assignee: Lockheed Martin Control Systems, Johnson City, NY (US)

( * ) Notice: Subject to any disclaimer, the term of this patent is extended or adjusted under 35 U.S.C. 154(b) by 0 days.

(21) Appl. No.: 09/597,636

(22) Filed: Jun. 20, 2000

(51) Int. Cl.$^7$ ..................................................... F01B 21/04
(52) U.S. Cl. ............................. 60/706; 60/698; 180/65.2; 180/65.4
(58) Field of Search ................... 60/698, 706; 180/65.1, 180/65.2, 65.3, 65.4, 65.5

(56) References Cited

U.S. PATENT DOCUMENTS

| | | | |
|---|---|---|---|
| 5,343,970 | * | 9/1994 | Severinsky .......................... 180/65.2 |
| 6,019,698 | * | 2/2000 | Lawrie et al. ........................... 477/5 |
| 6,155,365 | * | 12/2000 | Boberg ................................ 180/65.2 |

* cited by examiner

*Primary Examiner*—Hoang Nguyen
(74) *Attorney, Agent, or Firm*—Lerner, David, Littenberg, Krumholz & Mentlik, LLP

(57) ABSTRACT

An energy control unit for a hybrid vehicle is operable to control stored energy of an energy storage unit such that the energy level of the hybrid vehicle is maintained substantially at a desired magnitude. The energy level of the hybrid vehicle is a function of at least: (i) mechanical kinetic energy of the hybrid vehicle; (ii) mechanical potential energy of the hybrid vehicle; and (iii) potential energy of the energy storage unit.

55 Claims, 3 Drawing Sheets

ENERGY MANAGEMENT SYSTEM FOR HYBRID ELECTRIC VEHICLES

BACKGROUND OF THE INVENTION

1. Field of the Invention

The present invention relates to a system for controlling energy state aspects of a hybrid vehicle (of the type having an electric motor and some other fuel consuming prime mover) and, more particularly, the present invention relates to a system for monitoring and adjusting a "total energy level" for the hybrid vehicle such that energy storage conditions for providing drive energy to the electric motor are optimized and fuel consumption for prime mover is reduced.

2. Related Art

A conventional series hybrid vehicle may use an electric motor to provide mechanical drive power to the wheels and an internal combustion engine as a prime mover (i.e., an internal combustion engine that drives an alternator or generator, which, in turn, produces electrical energy that is stored and later used by the electric motor). A conventional control system for such a hybrid vehicle commands the electric motor and internal combustion engine to various operating speeds and torques to achieve desired drive power. The control system of the hybrid vehicle is also responsible for managing power flow to and from an electrical energy storage unit for storing the electrical energy used (or produced) by the electric motor. The electrical energy storage unit is usually a battery pack (e.g., a plurality of series/parallel connected batteries, such as lead acid batteries, nickel cadmium batteries, nickel metal hydride batteries, lithium batteries, etc.). Recharging the battery pack while operating the hybrid vehicle may be accomplished in any number of ways, for example: (i) using a generator and passive regulator, (ii) using a generator and an active recharging power converter, (iii) using an alternator and passive rectifier/regulator; and (iv) using an alternator and an active recharging inverter (AC to DC converter). It is understood that the above list is given by way of example and is not intended to be exhaustive. In any case, the generator or alternator is rotatably coupled to the internal combustion engine such that the generator or alternator is capable of producing a source of electrical power to recharge the battery pack in response to the rotational power provided by the internal combustion engine.

The conventional control system often monitors the state of charge of the battery pack and maintains the state of charge at approximately 60% of full charge. It is understood that the battery pack state of charge is not a tightly regulated quantity, rather, the control system provides course regulation to substantially within some range centered at about 60% state of charge. Often, the 60% state of charge results in: (i) a battery pack impedance which is relatively low (e.g., for lead acid batteries); (ii) a battery pack having a source of reserve energy capable of providing drive power for unforeseen upward grades (e.g., hill climbing) and/or acceleration, it being understood that power is the time rate of change of energy; and (iii) a battery pack having a charge space sufficient for recovering mechanical potential and/or mechanical kinetic energy from the hybrid vehicle during downward grades and/or deceleration (e.g., where the electric motor operates in a regenerative mode).

When the state of charge falls below the 60% level by a sufficient amount, the control system will cause the internal combustion engine and generator or alternator apparatus (hereinafter the "generator" for simplicity) to engage and provide electrical charging power to the battery pack. This is often accomplished by increasing the commanded speed and/or torque of the internal combustion engine. As the generator delivers electrical power to the battery pack, the state of charge of the battery pack increases. When the state of charge exceeds the 60% level by a sufficient amount, the control system will cause the internal combustion engine and generator to terminate delivery of electrical recharging power to the battery pack.

This control protocol for battery pack state of charge provides adequate results when operating over flat terrain, but becomes less satisfactory when the terrain includes a substantial number of upward and/or downward grades of substantial length. For example, when the hybrid vehicle is operating at a relatively high velocity and/or at a relatively high altitude, the probability that kinetic and/or potential energy from the hybrid vehicle may be recovered and stored in the battery pack is higher than when the hybrid vehicle is operating at relatively low velocities and/or low altitudes. Stated another way, a hybrid vehicle which has increased its velocity and/or climbed a substantial hill (increased its altitude) will usually reduce velocity and/or altitude at some point. This represents an opportunity to recover mechanical energy from the hybrid vehicle for recharging the battery pack.

Unfortunately, the prior art control systems are unable to account for mechanical kinetic and/or mechanical potential energies of the hybrid vehicle in the above-noted circumstances and, therefore, do not enjoy the advantages of efficient recovery of this energy. Further, these conventional control systems are incapable of anticipating upward and/or downward grades on which the hybrid vehicle may travel. Thus, adjustments in the desired state of charge of the battery pack cannot be made to optimize the state of charge of the battery pack for future energy demand and/or charge space requirements.

Accordingly, there is a need in the art for a new control system for hybrid vehicles capable of adjusting at least the energy state of an energy storage unit in a way which optimizes performance of the hybrid vehicles, particularly on upward and/or downward grades.

SUMMARY OF THE INVENTION

In order to overcome the disadvantages of the prior art, an energy control unit for a hybrid vehicle according to the present invention is operable to control the stored energy of an energy storage unit such that the energy level of the hybrid vehicle is maintained substantially at a desired magnitude. The energy level of the hybrid vehicle is a function of at least: (i) mechanical kinetic energy of the hybrid vehicle; (ii) mechanical potential energy of the hybrid vehicle; and (iii) potential energy of the energy storage unit (e.g., a battery pack, ultra-capacitor(s), lossless inductor(s), flywheel(s), etc.).

The hybrid vehicle preferably includes an electric motor operable to provide a source of drive power to the hybrid vehicle, and the energy storage unit is operatively coupled to the electric motor to provide a source of electrical energy to the electric motor. A prime mover (such as an internal combustion engine) is preferably operable to indirectly provide a source of energy to the electric motor. The prime mover may also be operable to directly provide a source of energy to the drive wheels of the hybrid vehicle.

It is preferred that the energy level of the hybrid vehicle is not considered to be a function of the potential energy of fuel utilized by the prime mover. The energy control unit is preferably operable to compare an estimated energy level of the hybrid vehicle with a desired magnitude and control the level of stored electrical potential energy in the energy storage unit in response to the comparison such that the energy level of the hybrid vehicle tends toward the desired magnitude.

According to another aspect of the invention, the energy control unit includes: a positioning system (such as the Global Positioning System, GPS) operable to receive signals from an external system (e.g., a GPS satellite system), where the signals contain information concerning longitudinal and latitudinal positions of the hybrid vehicle. The energy control unit also preferably includes: a terrain prediction unit operable to estimate one or more grade angles and lengths of surfaces on which the hybrid vehicle may travel in the future based on the information concerning the longitudinal and latitudinal positions of the hybrid vehicle; and a monitor operable to estimate a state of energy of the energy storage unit. The energy control unit further preferably includes a recharge controller operable to cause a charging system to initiate and/or terminate recharging energy to the energy storage unit as a function of at least one of: (i) a state of energy from the monitor indicating that the state of energy of the energy storage unit has reached or fallen below a first threshold level, (ii) a state of energy from the monitor indicating that the state of energy of the storage unit has reached or exceeded a second threshold level, (iii) the estimates of grade angles and lengths of the surfaces on which the hybrid vehicle may travel, (iv) an estimate of hybrid vehicle mechanical kinetic energy, and (v)an estimate of hybrid vehicle mechanical potential energy.

Other aspects, features, advantages and/or objects of the invention will become apparent to one skilled in the art from the disclosure herein when taken in conjunction with the accompanying drawings.

BRIEF DESCRIPTION OF THE DRAWINGS

For the purpose of illustrating the invention, there are shown in the drawings forms which are presently preferred, it being understood, however, that the invention is not limited to the precise arrangements and instrumentalities shown.

DETAILED DESCRIPTION OF THE INVENTION

Figure 1:
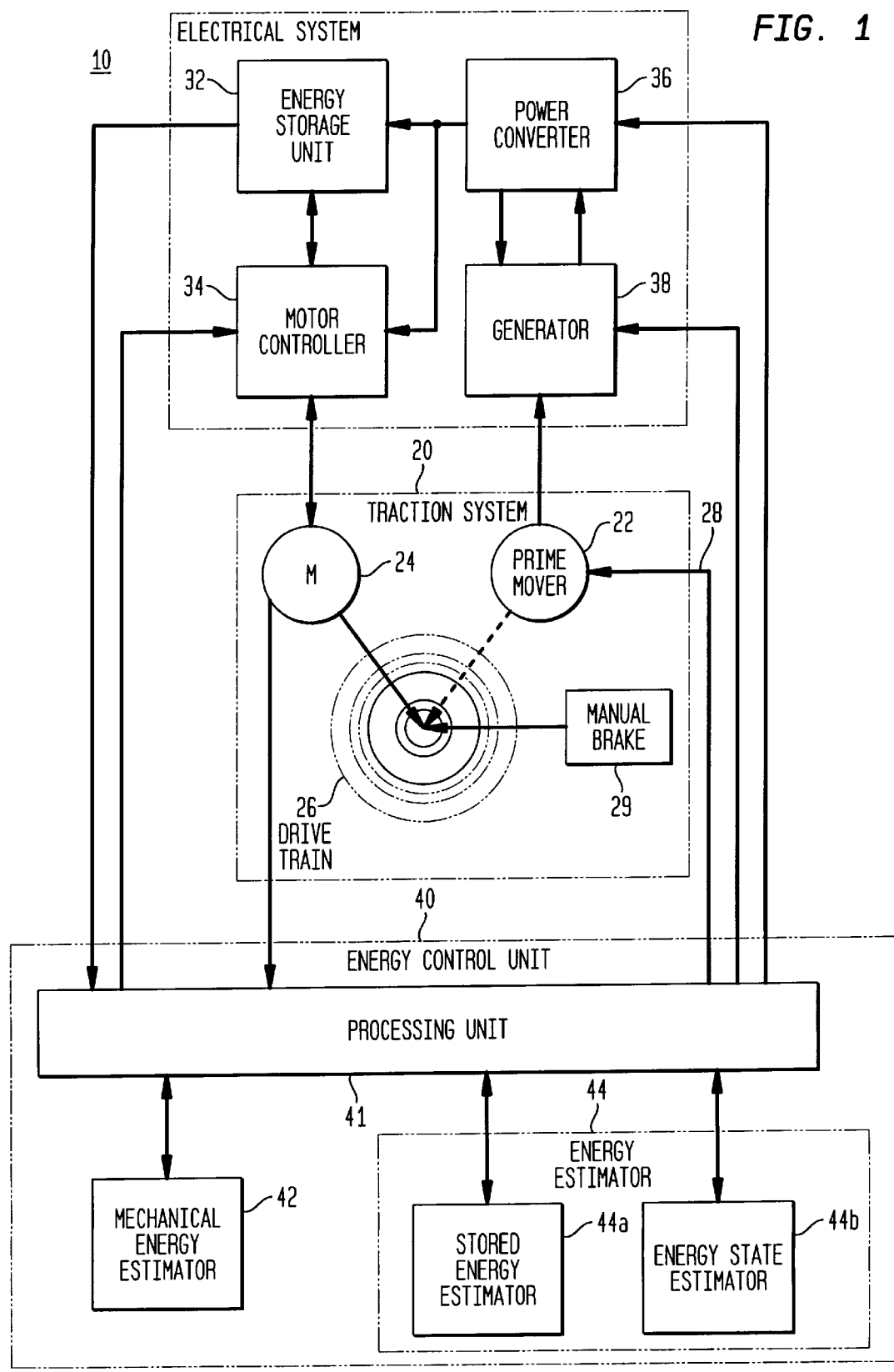
FIG. 1 is a block diagram illustrating a hybrid vehicle drive system including an energy management control system in accordance with the present invention.

Referring now to the drawings, wherein like numerals indicate like elements, there is shown in FIG. 1 a block diagram of a hybrid vehicle drive system 10 in accordance with the present invention. The hybrid vehicle drive system 10 includes a traction system 20, electrical system 30, and an energy control unit 40.

The traction system 20 includes a prime mover 22 (i.e., a fuel consuming source of rotational power, such as an internal combustion engine, gas turbine, steam engine, etc., the internal combustion engine being preferred). When the prime mover 22 is an internal combustion engine, it may be implemented using any of the known combustible fuel usage engines, for example, gasoline engines, diesel engines, natural gas engines, etc. The prime mover 22 operates at variable speeds and torques as a function of a throttle input 28. The prime mover 22 may be mechanically coupled to a drive train 26 of the vehicle through a clutch (not shown) as indicated in dashed line. This configuration would be used in a parallel or combination series/parallel hybrid vehicle. It is preferred, however, that a series hybrid configuration is implemented where there is no mechanical connection between the prime mover 22 and the drive train 26.

The prime mover 22 may also represent a fuel cell unit, which is known to convert a source of fuel into electrical energy. It is understood that the generator 38 would not be required when a fuel cell prime mover 22 is used. Rather, the fuel cell 22 would provide electrical energy directly to the power converter 36 (and/or to motor controller 34).

The traction system 20 also includes an electric motor 24 which is mechanically coupled to the drive train 26. The electric motor 24 may be implemented using any of the known types of motors, for example, DC brush motors, DC brushless motors, AC induction motors, etc. The electric motor 24 is capable of receiving electrical energy from the electrical system 30 (e.g., when providing driver power to the drive train 26) or delivering electrical energy to the electrical system 30 (e.g., when operating in a regenerative mode such that vehicle kinetic energy is converted into electrical energy).

The electrical system 30 includes an energy storage unit 32, a motor controller 34, a generator 38, and a power converter 36 (if needed). It is understood that generator 38 is utilized herein to represent either a DC generator or an AC alternator and, therefore, the power converter 36 may represent a passive or active converter circuit consistent therewith.

The energy storage unit 32 may carry out any of the known storage methods, such as, electrical energy storage, magnetic energy storage (e.g., a lossless inductor), and/or mechanical energy storage (e.g., a flywheel). Electrical energy storage units contemplated by the invention include known battery systems, for example, a series and/or parallel combination of lead acid batteries, nickel metal cadmium batteries, nickel metal hydride batteries, lithium batteries, etc. It is understood that so-called "ultra-capacitors" may also be utilized to store electrical energy and still fall within the scope of the invention, although battery packs are preferred. When a mechanical energy storage method, e.g., a flywheel, is used, an energy converter (such as generator 38) may be used to convert mechanical kinetic energy into electrical energy suitable for the electric motor 24.

The energy storage unit 32 is preferably a battery pack which provides a DC source of voltage and current (power) to the motor controller 34. The motor controller 34 receives the DC source of power from the energy storage unit 32 and conditions it in a manner consistent with the requirements of the electric motor 24. For example, when the electric motor 24 is an AC induction motor, the motor controller 34, includes a DC-AC inverter which produces multi-phase AC power suitable for use by the electric motor 24. Alternatively, when the electric motor 24 is a DC brushless motor, the motor controller 34 may include a DC to multi-phase DC converter suitable for providing multiple phases of switched DC power to the electric motor 24. Still further, when the electric motor 24 is a DC brush motor, the motor controller 34 may include a simplified regulator circuit capable of providing varying levels of DC power to the electric motor 24.

The generator 38 is preferably rotatably coupled to the internal combustion engine 22 such that rotational power provided by the internal combustion engine 22 is converted into electrical power (e.g., DC or AC voltage and current). The electrical power from the generator 38 is preferably coupled to the battery pack 32 directly or by way of power converter 36. Power converter 36 is operable to condition the electrical power from the generator 38 to provide recharging power to the energy storage unit 32.

The electric motor 24 is operable to provide at least a first source of drive power to the hybrid vehicle drive train 26. The prime mover 22 may be operable to provide a second source of drive power to the hybrid vehicle drive train 26 when a mechanical link is present. Otherwise, the prime mover 22 only provides drive power to the generator 38. Manual brake 29 may provide stopping energy (e.g., by way of drum and/or disc brakes) to the hybrid vehicle drive train 26 if the electric motor 24 is unable to provide stopping energy by way of capturing vehicle mechanical energy.

The energy control unit 40 is preferably an integrated processing unit which includes several distinct functional units, namely, a processing unit 41, a mechanical energy estimator 42 and an energy estimator 44. The energy estimator 44 preferably includes a stored energy estimator 44a and an energy state estimator 44b (e.g., a state of charge estimator when storage unit 32 is a battery pack). For simplicity, these functional units have been shown as distinct elements; however, those skilled in the art will appreciate that any or all of the functional units may be combined or integrated as may be deemed appropriate by the artisan.

Figure 2:
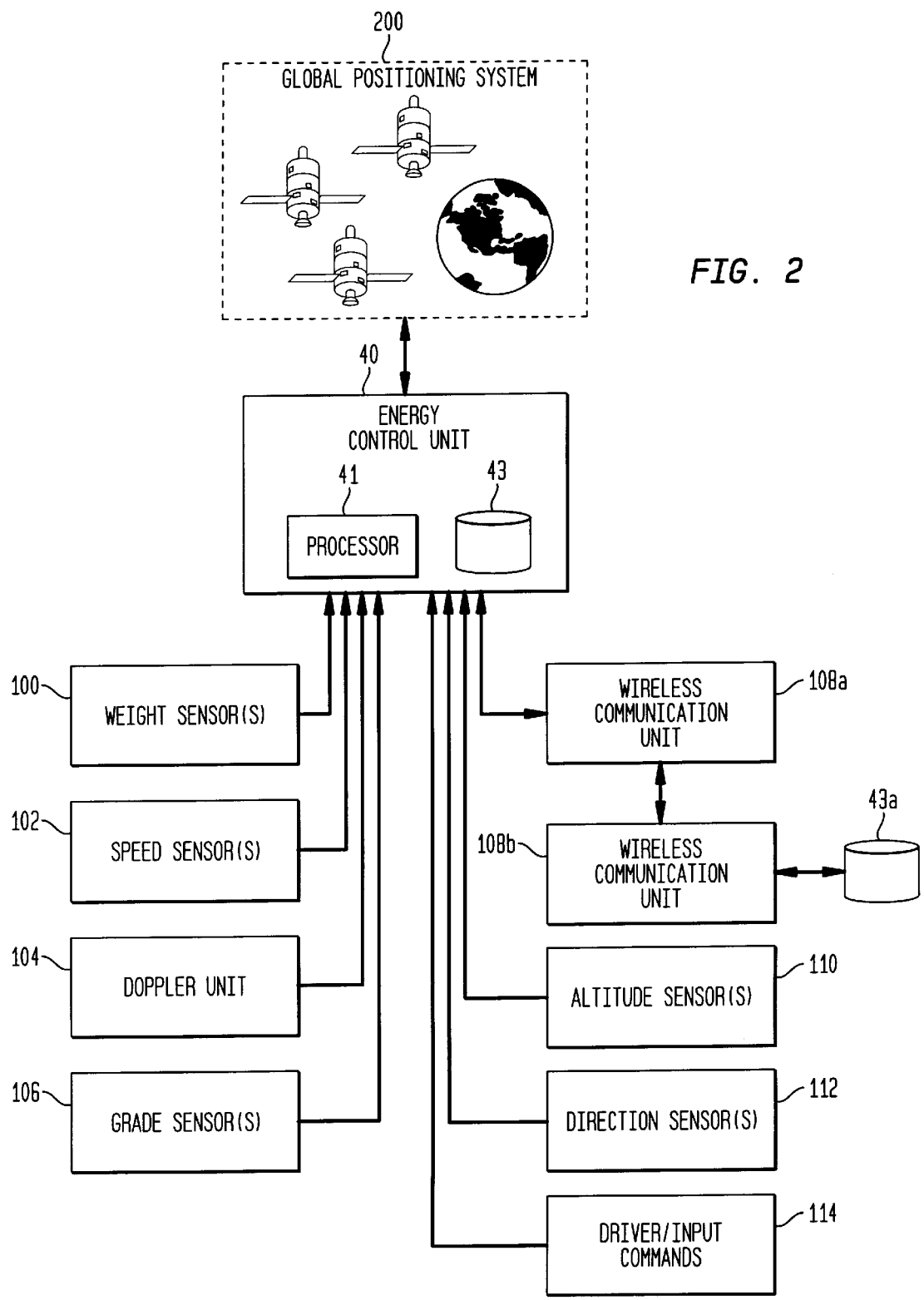
FIG. 2 is a block diagram illustrating further aspects of the present invention.

The energy control unit 40 receives a plurality of input signals from the traction system 20, electrical system 30, and other sources. Some of these input signals are shown entering the energy control unit 40 in FIG. 1. Some other input signals are shown entering the energy control unit 40 in FIG. 2 from weight sensor(s) 100, speed sensor(s) 102, Doppler unit(s) 104, grade sensor(s) 106, wireless communication unit(s) 108, altitude sensor(s) 110, direction sensor(s) 112, driver command(s) 114, and a Global Positioning System (GPS) 200. Those skilled in the art will appreciate that not all of the sensors of FIG. 2 are required to practice the invention. Further, although the sensors and the communication devices, etc. of FIG. 2 are shown schematically as single elements, single and/or plural sensors, communication devices, etc. are contemplated as being within the scope of the invention. The energy control unit 40 processes the input signals with the aid of the mechanical energy estimator 42 and energy estimator 44, and provides control signals to the traction system 20 and the electrical system 30 in a way which tends to maximize hybrid vehicle efficiency.

The energy control unit 40 is preferably operable to control, among other things, the stored energy in the energy storage unit 32 such that a "total energy level" of the hybrid vehicle is maintained substantially at a desired magnitude. In accordance with the invention, it is assumed that the "total energy level" of the hybrid vehicle is proportional to an aggregate of the mechanical kinetic energy of the hybrid vehicle, the mechanical potential energy of the hybrid vehicle, and the potential energy (stored energy) of the energy storage unit 32. Any potential energy associated with a fuel energy source of the prime mover 22 is not considered part of the "total energy level" of the hybrid vehicle. With an eye toward efficient conversion of fuel energy and stored energy to traction power (the time rate of change in energy), it is desirable to maintain the total energy level of the hybrid vehicle substantially at a desired magnitude (or set point), at least to the extent that the total energy level is maintained within a desirable range.

Those skilled in the art will appreciate that the total energy level of the hybrid vehicle is a substantially time varying quantity and, therefore, it is most preferable that the energy control unit 40 determines an average of the total energy level of the hybrid vehicle and maintains the average total energy level substantially at the desired magnitude. Most preferably, the energy control unit 40 provides a feedback control at a relatively low bandwidth (on the order of tens of minutes i.e., about 0.0001 to 0.0010 Hz) to ensure a stable energy management system.

The energy control unit 40 estimates the total energy level of the hybrid vehicle (and preferably an average of the total energy) in part using the mechanical energy estimator 42. The mechanical energy estimator 42 is operable to estimate the mechanical kinetic energy of the hybrid vehicle to be substantially proportional to a product of the weight of the hybrid vehicle and the square of the velocity (V) of the hybrid vehicle. Those skilled in the art will appreciate that the mass (m) of the vehicle may also be used by dividing the weight of the hybrid vehicle by the gravitational acceleration constant. More particularly, the mechanical kinetic energy of the hybrid vehicle is $\frac{1}{2} mV^2$.

An estimation of the weight (or mass) of the hybrid vehicle may be stored within the energy control unit 40 as a fixed quantity at the time of manufacture. This fixed quantity may be altered by adding a value corresponding to the fuel weight (or mass) obtained by a gauge and/or values corresponding to passenger weight (or mass) obtained by seat sensors. The fuel weight (or mass) and/or passenger weight (or mass) are schematically represented by weight sensor(s) 100 (FIG. 2). Alternatively, the hybrid vehicle mass (or weight) may be estimated using the well known equation F=mA and solving for mass, m. More particularly, the force, F, may be obtained by converting commanded (and/or measured) electric motor torque (e.g., foot-pounds) to force (e.g., pounds). Acceleration, A, may be obtained by measuring a change in hybrid vehicle velocity over the time at which the force, F, is applied (it being understood, however, that the grade on which the hybrid vehicle is travelling may be considered). The mass, m, may then be obtained by calculating the quotient of F and A.

The energy control unit 40 may obtain the velocity, V, of the hybrid vehicle in any number of ways, for example, (i) by estimating the hybrid vehicle velocity based on a speed measurement; and (ii) by estimating the hybrid vehicle velocity based on information received from at least one source external to the hybrid vehicle. For example, as to method (i), the energy control unit 40 may receive a speed signal 21 from the traction system 20 by way of vehicle speed sensor 102, which provides an indication of the vehicle velocity. Those skilled in the art will appreciate that this estimate of the vehicle velocity may be obtained using, for example, a speedometer. Alternatively, the energy control unit 40 may be in communication with or include a Doppler unit 104 (FIG. 2), where the Doppler unit 104 is operable to produce radar source signals and receive radar reflection signals to produce radar reflection measurements of vehicle speed. The Doppler unit 104 preferably includes a Doppler algorithm utilized to calculate the hybrid vehicle velocity based on the radar reflection measurements.

When the vehicle velocity is determined based on information received from a source external to the hybrid vehicle (method (ii)), the external source is preferably the Global Positioning System (GPS) 200 (FIG. 2) which is operable to provide radio signals which contain information concerning a longitudinal and latitudinal position of the hybrid vehicle. The energy control unit 40 is preferably operable to receive the radio signal information concerning the position of the hybrid vehicle from the GPS 200 and obtain an estimate of the hybrid vehicle velocity by calculating differences in position of the hybrid vehicle over time. It is understood that vehicle positions may be obtained from other types of external sources besides the GPS 200, for example, by road side transmitters positioned at various locations that transmit vehicle position information to the energy control unit 40. Alternatively, a cellular triangulation system in conjunction with the altitude sensor 110 may be employed to obtain vehicle positions and, thus, vehicle velocity.

Advantageously, once the energy control unit 40 (in particular, the mechanical energy estimator 42) receives and/or calculates vehicle velocity, vehicle weight (or mass), and/or vehicle acceleration, it is operable to estimate the mechanical kinetic energy of the hybrid vehicle, a quantity used to determine the total energy level of the hybrid vehicle.

The mechanical energy estimator 42 is also preferably operable to estimate the mechanical potential energy of the hybrid vehicle. In particular, the mechanical potential energy may be calculated to be substantially proportional to a product of the weight (or mass) and the altitude of the hybrid vehicle. The altitude of the hybrid vehicle is preferably determined with respect to some reference altitude, such as sea level. It is most preferred that the reference altitude is the altitude of the hybrid vehicle at so-called "key off" or "key-on". Key-off is when a driver last turned the hybrid vehicle off, e.g., by turning the ignition key off. Key-on is when the driver last turned the hybrid vehicle on, e.g., by way of the ignition key.

The mechanical energy estimator 42 may determine the altitude of the hybrid vehicle in any number of ways. For example, the altitude of the hybrid vehicle may be estimated as being proportional to a time integral of a grade angle of a surface on which the hybrid vehicle travels multiplied by vehicle speed. More particularly, the altitude may be obtained by time integrating a rise-over-run of the grade with respect to changes in the run. Alternatively, the mechanical energy estimator 42 may receive an estimate of the altitude of the hybrid vehicle from an altitude sensing system. Further, the mechanical energy estimator 42 may receive an estimate of the altitude of the hybrid vehicle based on information received from at least one source external to the hybrid vehicle.

When the mechanical energy estimator 42 estimates the altitude of the hybrid vehicle using the grade angle, an estimate of the grade angle may be obtained by adapting the equation of F=MA, discussed above, to account for grade angle (i.e., recognition that F increases and A reduces as grade angle increases). Those skilled in the art will appreciate that grade angle may also be obtained by comparing measured or commanded force(s), F1, required to move the hybrid vehicle (either at constant velocities or with acceleration) on a substantially level surface with measured or commanded force(s), F2, required to move the vehicle (at the same velocities/accelerations) on a grade angle. An increase from F1 to F2 may readily be used to determine the grade angle. Alternatively, an estimate of the grade angle may be obtained from a grade sensor 106 (e.g., a vertical gyro, inclinometer, etc.), see FIG. 2.

Figure 3:
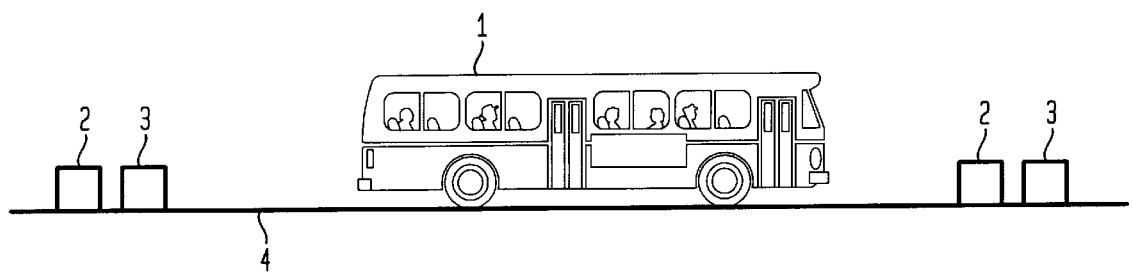
FIG. 3 is a schematic diagram of a hybrid vehicle located proximate to external information sources in accordance with the present invention.

The mechanical energy estimator 42 may also estimate the grade angle based on information received from at least one source external to the hybrid vehicle. With reference to FIG. 3, the hybrid vehicle 1 may be travelling on a surface 4 which includes a plurality of bar-coded placards 2 disposed proximate to the surface 4. Preferably, the bar-codes of the placards 2 contain information concerning the grade angle of the surface 4. With reference to FIG. 2, the hybrid vehicle 1 may include a grade sensor 106 (integral with and/or separate from the energy control unit 40) which is capable of scanning the bar-coded placards 2 and retrieving the information concerning the grade angle of the surface 4.

Alternatively, a plurality of radio devices 3 may be disposed proximate to the surface 4 on which the hybrid vehicle 1 travels. Radio signals propagating from the radio devices 3 may contain the information concerning the grade angle of the surface 4 and the grade sensor 106 (FIG. 2) of the hybrid vehicle 1 may be capable of receiving the radio signals and retrieving the grade angle information. Again, those skilled in the art will appreciate that the sensor 106 is not intended to be limited to a bar code sensor or radio sensor; rather, it may take any form apparent to the artisan and dictated by design exigencies. Those skilled in the art will appreciate that sensor 106 is referred to here as a "grade sensor" by way of example and not by way of limitation. Indeed, the bar codes of the placards 2 may contain virtually any useful information (e.g., altitude information, vehicle position information, etc.) and still be within the purview of the invention.

Still further, the source external to the hybrid vehicle may include the GPS 200 (FIG. 2). When interfacing with the GPS 200, the energy control unit 40 preferably includes a processor 41 and database 43 which are operable to obtain an estimate of the grade angle based on the longitudinal and latitudinal position information obtained from the GPS 200. More particularly, the database 43 is preferably a relational database containing a plurality of grade angles which are indexed by and retrievable using the position information obtained from the GPS 200. Those skilled in the art will appreciate that the database 43 need not reside in the hybrid vehicle itself, but may be located external to the hybrid vehicle. In this situation, the energy control unit 40 would include (integrally and/or separately), a wireless communication unit 108*a* (FIG. 2) which may communicate with the external database 43*a* through an external wireless communication unit 108*b*. In this way, the energy control unit 40 would be operable to communicate with the relational database 43*a* via a wireless communications channel represented by wireless communication units 108*a* and 108*b*. The information concerning the position of the hybrid vehicle (obtained from GPS 200) would be transmitted over the wireless communications channel to the external database 43*a* and, in response, the grade angle(s) from the database 43*a* would be transmitted to the hybrid vehicle over the wireless communications channel.

By way of summary, the energy control unit 40 (and the mechanical energy estimator 42 in particular) may estimate the altitude of the hybrid vehicle by taking a time integral of the grade angle of the surface on which the hybrid vehicle travels multiplied by vehicle speed. The grade angle may be obtained by grade sensor 106 or an external source (e.g., placards 2, radio devices 3, or GPS 200 in combination with a relational data base 43). Those skilled in the art will appreciate that the database 43 need not be employed if the GPS 200 is adapted to directly provide grade angle information.

Alternatively, the energy control unit 40 may obtain an estimate of the altitude of the hybrid vehicle from an altitude sensor 110 (FIG. 2) such as an altimeter or other sensor known to the artisan. Further, the energy control unit 40 may obtain an estimate of the altitude of the hybrid vehicle based upon information received from at least one external source, such as the bar-coded placards 2 or radio devices 3 (FIG. 3), where the bar-coded placards 2 and radio devices 3 are adapted to provide information concerning the altitude of the surface 4 on which the hybrid vehicle 1 travels. Those skilled in the art will appreciate that the bar-coded placards 2 and/or radio devices 3 may include information concerning the grade angle of the surface 4, altitude of the surface 4, and/or any other information based on design exigencies. Further, the energy control unit 40 may receive altitude information from the GPS 200. If a positioning system is used which does not provide altitude information directly (i.e, provides only longitude and latitude information), the altitude of the hybrid vehicle may be obtained based on the longitudinal and latitudinal position information using the onboard database 43 (or the external database 43*a*). Indeed, the database 43 (or 43*a*) may include a plurality of altitudes which are indexed by, and retrievable using, the information concerning the position of the hybrid vehicle.

Advantageously, once the energy control unit (in particular, the mechanical energy estimator) receives and/or calculates the vehicle weight (or mass) and altitude, it is operable to estimate the mechanical potential energy of the hybrid vehicle, a quantity used to determine the total energy level of the hybrid vehicle.

With reference to FIG. 1, the energy estimator 44*a* is preferably operable to estimate the potential energy of the energy storage unit 32. As the energy storage unit 32 is preferably a battery pack, the energy estimator 44*a* is preferably an electrical energy estimator capable of estimating the potential electrical energy stored in the battery pack. For the purposes of illustration (and not by way of limitation), the energy estimator 44*a* will be treated below as an electrical energy estimator 44*a* and the energy storage unit 32 will be treated below as a battery pack 32. The electrical energy estimator 44*a* may calculate the stored electrical potential energy to be substantially proportional to a time integral of a product of a voltage and current, I, of the battery pack 32. Thus, if a reference energy level of the battery pack 32 is known (such as that of fully charged battery pack), a difference between the reference energy level and the integral of voltage-I over time will yield a value proportional to the electrical potential energy of the battery pack 32.

Advantageously, the energy control unit 40 in accordance with the invention is capable of monitoring the mechanical energy (kinetic and potential) of the hybrid vehicle as well as the stored electrical potential energy in the battery pack 32 to determine whether an aggregate of the mechanical and electrical energy of the hybrid vehicle deviates from a desired level or a desired range. In particular, if the average total energy of the hybrid vehicle deviates substantially from the desired magnitude, (i.e., is outside a desired range) the energy control unit 40 is capable of adjusting the stored potential energy of the battery pack 32, for example, by permitting or preventing battery charging. This is preferably accomplished using an internal combustion engine as the prime mover 22, the generator 38, and the power converter 36 in combination, as well as the manual brake 29.

Thus, when the hybrid vehicle is travelling at a relatively high speed and at a relatively high altitude, the probability of requiring substantial energy from the battery pack 32 and/or the prime mover 22 (e.g., an internal combustion engine) is reduced and battery pack 32 charging may be likewise reduced. Stated another way, at relatively high vehicle speeds and/or high altitudes, the likelihood that mechanical energy recovery may be obtained (by way of regenerative energy conversion) is relatively high. Thus, greater charge space in the battery pack 32 may be desirable. Conversely, when the hybrid vehicle is travelling at relatively low speeds and/or at relatively low altitudes, the probability that substantial energy would be required from the battery pack 32 will increase and, therefore, increased stored charge (i.e., less charge space in the battery pack 32) may be desirable.

Those skilled in the art will appreciate that the energy control unit 40 may provide additional advantageous functions, such as permitting the generator 38 to provide a source of electrical power to the motor controller 34 when the motor controller 34 calls for current. This may be accomplished by delivering current from the generator 38, through the power converter 36, to the motor controller 34. Therefore, when the electric motor 24 is commanded to provide a substantial amount of drive power to the vehicle drive train 26, the battery pack 32 will not be overburdened (in terms of current requirements) because the generator 38 may provide the additional desired current. Further, the energy control unit 40 may be programmed to provide advantageous throttle levels 28 to the prime mover 22 (e.g., an internal combustion engine) based on certain vehicle criteria. For example, the energy control unit 40 is preferably operable to prevent the throttle level 28 from substantially exceeding an idle level when the hybrid vehicle is at a stop or when the motor controller 36 is operating in a regeneration mode (i.e., when vehicle kinetic energy is being converted into electrical energy suitable for recharging the battery pack 32).

Reference is now made to FIGS. 2 and 4 in connection with a discussion of an alternative embodiment of the present invention. As discussed above, the energy control unit 40 is capable of receiving radio signals from the GPS 200, which radio signals contain information concerning the position of the hybrid vehicle. In accordance with this embodiment of the invention, the energy control unit 40 is preferably capable of predicting the grade angles (and lengths thereof) of the surfaces on which the hybrid vehicle will travel such that the energy state of the energy storage unit 32 may be optimized. In this way, the energy control unit 40 may be programmed to act as a terrain prediction unit 41 (e.g., using processor 41) capable of estimating a route over which the hybrid vehicle will travel and, therefore, predict the grades over which the hybrid vehicle will travel. The terrain prediction unit 41 may be integral with and/or separately provided from the energy control unit 40.

Figure 4A:
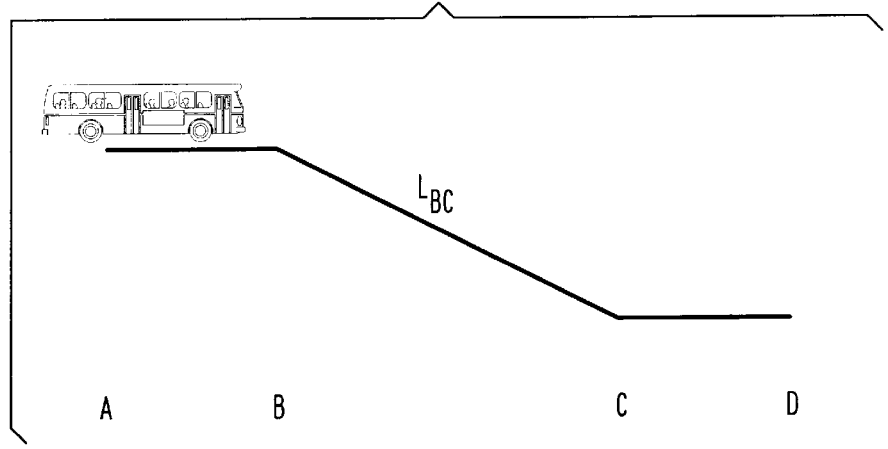
FIGS. 4a and 4b schematically illustrates basic grade angle configurations, which may be efficiently handled by the energy control system of the present invention.
Figure 4B:
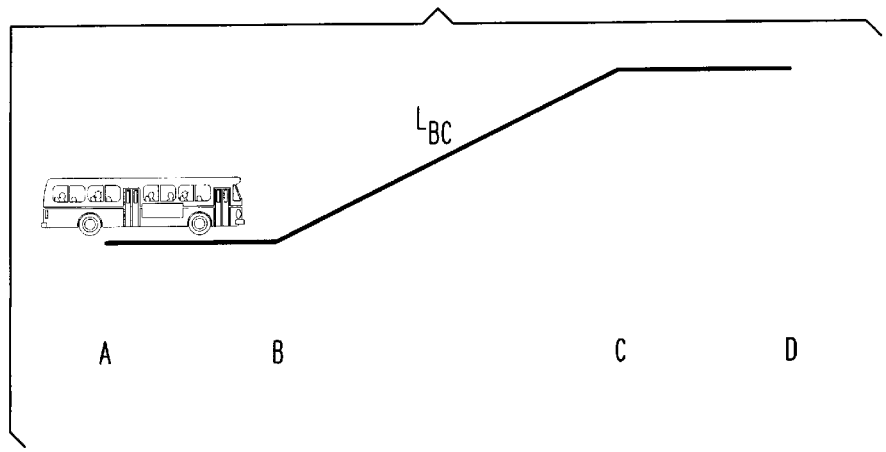

The advantages of the terrain prediction unit 41 of the present invention are best understood with reference to FIGS. 4*a* and 4*b* and recalling that conventional energy management systems attempt to maintain the state of charge of a battery pack at approximately 60%. Indeed, the conventional energy management systems will often command the recharging of the battery pack when the state of charge of the battery pack has reached or fallen below a first threshold level (or set point), for example, 50% state of charge. The conventional energy management systems will automatically terminate recharging when the state of charge of the battery pack reaches or exceeds a second threshold level (or set point), such as 70% state of charge. In accordance with the present invention, this recharging protocol may be ignored and/or the threshold automatically adjusted based on information concerning future grades over which the hybrid vehicle will travel.

For example, with reference to FIG. 4*a*, the electric vehicle may be travelling on a surface as indicated by position reference A. In the future, the hybrid vehicle will be travelling on a downward grade (starting at reference position B) over a distance $L_{BC}$ to reference position C. At position C, the hybrid vehicle will again travel on a substantially level surface. If the energy state of the energy storage unit 32 falls below the first threshold level at any point between positions A and B (i.e., indicating that a conventional energy management system should commence energy recharging), the energy control unit 40 of the present invention may not initiate energy recharging.

By way of example, when the energy storage unit 32 is a battery pack 32, if the grade angle and distance from position B to position C are sufficient to at least partially recharge the battery pack 32 (by way of regeneration), then battery charging may not be initiated. Indeed, the kinetic and/or potential energy of the hybrid vehicle may be converted into electrical energy suitable for increasing the state of charge of the battery pack 32 at least above the first threshold (e.g., 50%) when the hybrid vehicle is travelling between positions B and C. Thus, the energy control unit 40 may prevent the generator 38 from providing recharging energy to the battery pack 32 irrespective of whether the state of charge estimator 44b indicates that the state of charge has reached or fallen below the first threshold level at position B. Instead, when the terrain prediction unit 41 indicates that the downward grade angle between positions B and C and length $L_{BC}$ will be sufficient to convert the mechanical potential energy of the hybrid vehicle into recharging energy for the battery pack 32, recharging is postponed or omitted altogether. This may be accomplished by automatically adjusting the first threshold level downward (either by a discrete quantum or in analog fashion).

Preferably, the amount of mechanical potential energy (from B to C) is sufficient to increase the state of charge of the battery pack 32 to a level which meets and/or exceeds the second threshold level (e.g., 70%). Those skilled in the art, however, will appreciate that even when the downward grade angle and length are not sufficient to increase the state of charge of the battery pack 32 to the second threshold level, charging may nevertheless be postponed until the vehicle has reached or passed position C. In postponing or canceling battery recharging (e.g., by adjustment of the first threshold), the energy control unit 40 should ensure that the state of charge of the battery pack 32 does not fall below a minimum threshold prior to or at position B, as severely discharging the battery pack 32 may adversely affect the integrity of the battery pack 32 and/or vehicle performance.

The present invention serves in a second aspect with regard to converting a larger amount of available mechanical kinetic energy and/or mechanical potential energy of the hybrid vehicle into stored (electrical) energy than would a conventional energy management system. The energy control unit 40 may prevent the generator 38 from providing recharging energy to the energy storage unit 32 (e.g., battery pack) irrespective of whether the state of energy estimator 44b indicates that the state of energy has reached or fallen below the first threshold level at position B. By so doing, the energy control unit 40 assures that greater space in the energy storage unit 32 is available for storing energy before a maximum threshold is reached prior to, or at position C. Available mechanical kinetic and/or mechanical potential energy above this maximum amount may be absorbed by means of application of the manual brake 29 and converted to unrecoverable thermal energy.

With reference to FIG. 4b, the energy control unit 40 may be programmed to initiate battery recharging (utilizing generator 38 and/or power converter 36) prior to position B irrespective of whether the state of charge estimator 44b indicates that the state of charge of the battery pack 32 is at or below the first threshold level. Indeed, when the terrain prediction unit 41 indicates that a substantial upward grade angle and length $L_{BC}$ (from position B to C) will be encountered, the energy control unit 40 may initiate battery recharging before position B such that a desirable quantum of electrical potential energy is stored within battery pack 32 prior to or during an ascent from B to C. This may be accomplished, for example, by automatically increasing the first threshold level. The advantages of, and variations available to, this protocol will be apparent to the skilled artisan in light of the teachings above.

With reference to FIG. 2, the terrain prediction unit 41 of the energy control unit 40 preferably utilizes at least one of the grade angle(s) and altitude(s) that the hybrid vehicle will experience in determining whether or not to: (i) prevent battery charging, (ii) commence battery charging, or (iii) terminate battery charging. In particular, the terrain prediction unit preferably estimates the grade angle(s) (and respective length(s) thereof) of the surface(s) on which the hybrid vehicle may travel in the future based on the position and altitude information received from, for example, the GPS 200 in combination with an estimate of the direction of travel of the hybrid vehicle. For example, the terrain prediction unit 41 may estimate a future position of the hybrid vehicle as a function of (i) a given position of the hybrid vehicle; (ii) the direction of travel of the hybrid vehicle; and (iii) the velocity of the hybrid vehicle. The estimated position of the hybrid vehicle may then be utilized to retrieve future altitude, grade angle, and/or length of grade information from, for example, the GPS 200 alone or in combination with the database 43.

As discussed above, vehicle positions may be obtained from other types of external sources besides the GPS 200, for example, by road side transmitters positioned at various locations that transmit vehicle position information to the energy control unit 40. Alternatively, a cellular triangulation system in conjunction with the altitude sensor 110 may be employed to obtain vehicle positions.

The terrain prediction unit 41 may obtain the direction of travel from, for example, a direction sensor 112 (FIG. 2), such as a compass, etc. A succession of longitudinal measurements (e.g., from the GPS 200) may be used to calculate the direction of travel of the hybrid vehicle. Alternatively, the terrain prediction unit 41 of the energy control unit 40 may be in communication with a route memory (which may be contained within database 43 and/or external database 43a). The route memory preferably contains a plurality of stored routes over which the hybrid vehicle may travel. The stored routes contain at least one of: (i) a plurality of future positions; (ii) a plurality of altitudes; (iii) a plurality of grade angles; and/or (iv) a plurality of lengths of grade, which the hybrid vehicle may attain when travelling the given route. Therefore, the terrain prediction unit 41 may estimate a future grade angle (and associated length) and/or a future altitude based on the information contained in the route memory (e.g., database 43).

The terrain prediction unit 41 is preferably operable to select one of the stored routes in an automated fashion by monitoring one or more of the past and present positions of the hybrid vehicle and estimating which of the stored routes substantially matches the monitored positions. Alternatively, the terrain prediction unit 41 may select one of the stored routes based upon instructional data (or driver commands) 114 (FIG. 2) received from a driver of the hybrid vehicle. For example, the driver may provide a request for directions to a particular destination via driver input/commands 114. The terrain prediction unit 41 preferably selects one of the stored routes which leads to the destination. As the terrain prediction unit 41 knows what positions the hybrid vehicle will attain during the route to the destination, it utilizes the information in determining the grade angles, lengths of grade, and altitude of the surfaces on which the hybrid vehicle will travel.

The driver input/commands 114 may also include a programmed seat position of the driver (assuming the hybrid vehicle has the capability of storing a seat position) which aides the terrain prediction unit 41 in selecting one of the stored routes within the route memory. Indeed, drivers often drive over predictable routes, such as to work, retail establishments, etc. Thus, a stored seat position may be used to identify a particular driver and, therefore, identify likely routes of travel.

Although the invention herein has been described with reference to particular embodiments, it is to be understood that these embodiments are merely illustrative of the principles and applications of the present invention. It is therefore to be understood that numerous modifications may be made to the illustrative embodiments, and that other arrangements may be devised without departing from the spirit and scope of the present invention as defined by the appended claims.

What is claimed is:

1. An energy control unit for a hybrid vehicle, the hybrid vehicle including an electric motor operable to provide a source of drive power to the hybrid vehicle, an energy storage unit operatively coupled to the electric motor to provide a first source of energy to the electrical motor, and a prime mover operatively coupled to the electric motor to provide a second source of energy to the electric motor, the energy control unit being operable to control an amount of stored potential energy of the energy storage unit such that an energy level of the hybrid vehicle is maintained substantially at a desired magnitude, the energy level of the hybrid vehicle being a function of at least: (i) mechanical kinetic energy of the hybrid vehicle; (ii) mechanical potential energy of the hybrid vehicle; and (iii) potential energy of the energy storage unit.

2. The energy control unit of claim 1, wherein the energy storage unit is taken from the group consisting of at least one battery, at least one ultra-capacitor, at least one lossless inductor, and at least one flywheel.

3. The energy control unit of claim 1, wherein the prime mover is taken from the group consisting of internal combustion engines, gas turbine engines, steam engines, and fuel cells.

4. The energy control unit of claim 1, wherein:
the prime mover is operable to convert potential energy contained in fuel into the second source of energy; and
the energy level of the hybrid vehicle is not a function of the potential energy of the fuel.

5. The energy control unit of claim 1, wherein the energy control unit is operable to maintain an average of the energy level of the hybrid vehicle substantially at the desired magnitude.

6. The energy control unit of claim 1, wherein the energy level of the hybrid vehicle is proportional to an aggregate of: (i) the mechanical kinetic energy of the hybrid vehicle; (ii) the mechanical potential energy of the hybrid vehicle; and (iii) the potential energy of the energy storage unit.

7. The energy control unit of claim 1, wherein the energy control unit is operable to compare an estimated energy level of the hybrid vehicle with a desired magnitude and control the stored potential energy of the energy storage unit in response to the comparison such that the energy level of the hybrid vehicle tends toward the desired magnitude.

8. The energy control unit of claim 7, wherein the energy control unit operates at a relatively low bandwidth of about 0.0001 to 0.0010 Hertz such that the energy level of the hybrid vehicle tends toward the desired magnitude at a relatively low rate.

9. The energy control unit of claim 7, wherein the energy control unit is operable to estimate at least one of the mechanical kinetic energy of the hybrid vehicle, the mechanical potential energy of the hybrid vehicle, and the potential energy of the energy storage unit.

10. The energy control unit of claim 9, wherein the energy control unit includes at least one of: a mechanical energy estimation unit operable to estimate the mechanical kinetic energy and mechanical potential energy of the hybrid vehicle; and an energy estimation unit operable to estimate the potential energy of the energy storage unit.

11. The energy control unit of claim 9, wherein the energy control unit is operable to estimate the mechanical kinetic energy of the hybrid vehicle to be substantially proportional to a product of hybrid vehicle weight or mass and a square of hybrid vehicle velocity.

12. The energy control unit of claim 11, wherein the energy control unit is operable to at least one of: (i) estimate the hybrid vehicle weight or mass by aggregating a base vehicle weight or mass with at least one of an estimate of passenger weight or mass and an estimate of fuel weight or mass; and (ii) use a stored estimate of the hybrid vehicle weight or mass.

13. The energy control unit of claim 11, wherein the energy control unit is operable to at least one of: (i) estimate the hybrid vehicle velocity based on a speed measurement from a speed sensor; and (ii) estimate the hybrid vehicle velocity based on information received from at least one source external to the hybrid vehicle.

14. The energy control unit of claim 13, wherein the energy control unit is operable to estimate the hybrid vehicle velocity based on obtaining radar reflection measurements and employing a Doppler algorithm.

15. The energy control unit of claim 14, wherein the energy control unit is in communication with a Doppler unit of the hybrid vehicle, the Doppler unit being operable to produce radar source signals and receive radar reflection signals to produce the radar reflection measurements.

16. The energy control unit of claim 13, wherein the vehicle speed sensor includes a speedometer system.

17. The energy control unit of claim 13, wherein:
the at least one source external to the hybrid vehicle includes a Global Positioning System (GPS) operable to provide radio signals which contain information concerning a longitudinal and latitudinal position of the hybrid vehicle; and
the energy control unit is operable to receive the radio signal information concerning the position of the hybrid vehicle and obtain an estimate of the hybrid vehicle velocity by calculating differences in position of the hybrid vehicle over time.

18. The energy control unit of claim 9, wherein the energy control unit is operable to estimate the mechanical potential energy of the hybrid vehicle to be substantially proportional to a product of hybrid vehicle weight or mass and an altitude of the hybrid vehicle.

19. The energy control unit of claim 18, wherein the energy control unit is operable to at least one of: (i) estimate the hybrid vehicle weight or mass by calculating a quotient of an estimated force and an estimated acceleration of the hybrid vehicle; and (ii) use a stored estimate of the hybrid vehicle weight or mass.

20. The energy control unit of claim 18, wherein the energy control unit is operable to at least one of: (i) estimate the altitude of the hybrid vehicle as being proportional to a time integral of a grade angle of a surface on which the hybrid vehicle travels multiplied by a velocity of the hybrid vehicle; (ii) receive an estimate of the altitude of the hybrid vehicle from an altitude sensor; and (iii) estimate the altitude of the hybrid vehicle based on information received from at least one source external to the hybrid vehicle.

21. The energy control unit of claim 20, wherein the energy control unit is operable to at least one of (i) estimate the grade angle by estimating a force required to move the hybrid vehicle on the grade angle and calculating the grade angle therefrom; (ii) receive an estimate of the grade angle from a grade angle sensor; and (iii) estimate the grade angle based on information received from at least one source external to the hybrid vehicle.

22. The energy control unit of claim 21, wherein the grade angle sensor includes at least one of a vertical gyro and an inclinometer.

23. The energy control unit of claim 21, wherein the at least one source external to the hybrid vehicle includes bar-coded placards disposed proximate to the surface on which the hybrid vehicle travels, wherein bar-codes of the placards contain the information concerning the grade angle of the surface.

24. The energy control unit of claim 21, wherein the at least one source external to the hybrid vehicle includes at least one radio device, wherein radio signals propagate from the at least one radio device which contain the information concerning the grade angle of the surface.

25. The energy control unit of claim 21, wherein:
the at least one source external to the hybrid vehicle includes a Global Positioning System (GPS) operable to provide radio signals which contain information concerning a longitudinal and latitudinal position of the hybrid vehicle; and
the energy control unit is operable to receive the radio signal information concerning the position of the hybrid vehicle and obtain an estimate of the grade angle of the surface based thereon.

26. The energy control unit of claim 25, wherein the energy control unit includes a database containing a plurality of grade angles which are indexed by and retrievable using the information concerning the position of the hybrid vehicle.

27. The energy control unit of claim 25, wherein the energy control unit is operable to communicate with a database external to the hybrid vehicle, the external database containing a plurality of grade angles which are indexed by and retrievable using the information concerning the position of the hybrid vehicle.

28. The energy control unit of claim 27, wherein the energy control unit is operable to (i) communicate with the external database via a wireless communication channel; (ii) transmit the information concerning the position of the hybrid vehicle to the external database over the wireless communication channel; and (iii) receive the grade angles from the external database over the wireless communication channel.

29. The energy control unit of claim 20, wherein the altitude sensor includes a altimeter.

30. The energy control unit of claim 20, wherein the at least one source external to the hybrid vehicle includes bar-coded placards disposed proximate to the surface on which the hybrid vehicle travels, wherein bar codes of the placards contain the information concerning the altitude of the hybrid vehicle.

31. The energy control unit of claim 20, wherein the at least one source external to the hybrid vehicle includes at least one radio device, wherein radio signals propagate from the at least one radio device which contain the information concerning the altitude of the hybrid vehicle.

32. The energy control unit of claim 31, wherein:
the at least one source external to the hybrid vehicle includes a Global Positioning System (GPS) operable to provide radio signals which contain information concerning the altitude of the hybrid vehicle; and
the energy control unit is operable to receive the radio signal information concerning the altitude of the hybrid vehicle and obtain an estimate of the altitude of the hybrid vehicle based thereon.

33. The energy control unit of claim 9, wherein the energy storage unit is an electrical energy storage unit and the energy control unit is operable to estimate electrical potential energy of the electrical energy storage unit to be substantially proportional to a time integral of a product of a voltage and current of the electrical energy storage unit.

34. The energy control unit of claim 1, wherein:
the hybrid vehicle includes a motor controller operably coupled to the energy storage unit and operable to convert the stored energy of the energy storage unit into electrical energy for rotating the electric motor, and a generator rotatably coupled prime mover and operable to provide a source of electrical energy to the energy storage unit; and
the energy control unit is operable to (i) monitor an output of the energy storage unit; and (ii) cause the source of electrical energy from the generator to deliver at least some of that electrical energy directly to the motor controller.

35. The energy control unit of claim 1, wherein:
the hybrid vehicle includes a motor controller operably coupled to the energy storage unit and operable to provide electrical energy for rotating the electric motor; and
the energy control unit is operable to cause the prime mover to operate at a rotational speed at or below an idle level when: (i) the hybrid vehicle is at a stop; and (ii) the electric motor and motor controller operate in a regeneration mode.

36. A drive system for a hybrid vehicle, comprising:
an electric motor operable to provide a source of drive power to the hybrid vehicle;
a motor controller operable to provide electrical energy for rotating the electric motor;
an energy storage unit operatively coupled to the motor controller to provide a source of energy to the motor controller;
an prime mover operatively operable to provide a source of rotational energy;
a charging system operable to convert the rotational energy from the prime mover into recharging energy for the energy storage unit; and
an energy control unit operable to control an amount of stored potential energy of the energy storage unit such that an energy level of the hybrid vehicle is maintained substantially at a desired magnitude, the energy level of the hybrid vehicle being a function of at least: (i)

mechanical kinetic energy of the hybrid vehicle; (ii) mechanical potential energy of the hybrid vehicle; and (iii) potential energy of the energy storage unit.

37. An energy control unit for a hybrid vehicle, the hybrid vehicle including (i) an electric motor operable to provide a source of drive power to the hybrid vehicle, (ii) a motor controller operable to provide electrical energy for rotating the electric motor, (iii) an energy storage unit operatively coupled to the motor controller to provide a source of energy to the motor controller, (iv) a prime mover operable to provide a source of rotational energy, and (v) a charging system operable to convert the rotational energy from the prime mover into recharging energy for the energy storage unit, the energy control unit comprising:

a positioning system operable to receive signals from an external source, the signals containing information concerning longitudinal and latitudinal positions of the hybrid vehicle;

a terrain prediction unit operable to estimate one or more grade angles and lengths of surfaces on which the hybrid vehicle may travel in the future based on the information concerning the longitudinal and latitudinal positions of the hybrid vehicle; and a monitor operable to estimate a state of energy of the energy storage unit, the energy control unit being operable to cause the charging system to at least one of provide and terminate the recharging power to the electrical energy storage unit as a function of at least one of: (i) a state of energy from the monitor indicating that the state of energy of the energy storage unit has reached or fallen below a first threshold level, (ii) a state of energy from the monitor indicating that the state of energy of the energy storage unit has reached or exceeded a second threshold level, and (iii) the estimates of grade angles and lengths of the surfaces on which the hybrid vehicle may travel.

38. The energy control unit of claim 37, wherein the energy storage unit is taken from the group consisting of at least one battery, at least one ultra-capacitor, at least one lossless inductor, and at least one flywheel.

39. The energy control unit of claim 37, wherein the prime mover is taken from the group consisting of internal combustion engines, gas turbine engines, steam engines, and fuel cells.

40. The energy control unit of claim 37, wherein the positioning system is a Global Positioning System (GPS) unit operable to receive radio signals from a GPS satellite system.

41. The energy control unit of claim 37, wherein the energy control unit is operable to: (i) cause the charging system to provide the recharging energy to the energy storage unit when the monitor indicates that the state of energy has reached or fallen below the first threshold level, and (ii) cause the charger to terminate recharging energy to the energy storage unit when the monitor indicates that the state of energy has reached or exceeded the second threshold level.

42. The energy control unit of claim 41, wherein the energy control unit is operable to automatically adjust when the charging system provides the recharging energy to the energy storage unit when the estimates of the grade angles and lengths of the surfaces on which the hybrid vehicle may travel indicate: (i) that one or more downward grades may be reached using a quantum of energy from the energy storage unit which will not reduce the state of energy of the energy storage unit below a minimum threshold, and (ii) one or more of the lengths of the downward grades are sufficient to recover at least a substantial portion of the quantum of energy by converting mechanical potential energy of the hybrid vehicle into electrical energy.

43. The energy control unit of claim 41, wherein the energy control unit is operable to automatically adjust when the charging system provides the recharging energy to the energy storage unit when the estimates of the grade angles of the surfaces on which the hybrid vehicle may travel indicate that one or more upward grades may be reached having respective lengths which will require a quantum of energy from the energy storage unit sufficient to reduce the state of energy of the energy storage unit below at least the first threshold level.

44. The energy control unit of claim 41, wherein the energy control unit is operable to automatically adjust when the charging system provides the recharging energy to the energy storage unit when the estimates of the grade angles of the surfaces on which the hybrid vehicle may travel indicate: (i) that one or more downward grades may be reached using a quantum of energy from the energy storage unit which will not reduce the state of energy of the energy storage unit below a minimum threshold, and (ii) one or more lengths of the downward grades are sufficient to recover enough energy to increase the state of energy of the energy storage unit to at least the second threshold level by converting mechanical potential energy of the hybrid vehicle into electrical energy.

45. The energy control unit of claim 37, wherein the terrain prediction unit is in communication with a database containing a plurality of grade angles and lengths of the grade angles which are indexed by and retrievable using the information concerning the longitudinal and latitudinal position of the hybrid vehicle.

46. The energy control unit of claim 45, wherein the terrain prediction unit estimates one or more grade angles and respective lengths of surfaces on which the hybrid vehicle may travel in the future based on the information concerning the longitudinal and latitudinal positions of the hybrid vehicle and at least one direction of travel.

47. The energy control unit of claim 46, wherein the terrain prediction unit estimates a future position of the hybrid vehicle based on: (i) a given position of the hybrid vehicle, (ii) the direction of travel, and (iii) a velocity of the hybrid vehicle.

48. The energy control unit of claim 47, wherein the terrain prediction unit estimates the one or more grade angles and respective lengths of surfaces on which the hybrid vehicle may travel in the future by retrieving at least one of the plurality of grade angles and lengths from the database using the estimated future position of the hybrid vehicle as an index.

49. The energy control unit of claim 47, wherein the terrain prediction unit obtains the direction of travel from a direction sensor.

50. The energy control unit of claim 45, wherein the terrain prediction unit is in communication with a route memory containing travel information for one or more stored routes, and the travel information for a given one of the stored routes includes future positions of the hybrid vehicle when traveling the given route.

51. The energy control unit of claim 50, wherein the terrain prediction unit estimates the one or more grade angles and respective lengths of surfaces on which the hybrid vehicle may travel in the future by retrieving at least one of the plurality of grade angles and lengths from the database using the future positions of the hybrid vehicle as indices.

52. The energy control unit of claim 50, wherein the terrain prediction unit is operable to select one of the stored routes by monitoring one or more of the positions of the hybrid vehicle and estimating which of the stored routes substantially matches the monitored positions.

53. The energy control unit of claim 50, wherein the terrain prediction unit is operable to select one of the stored routes based on receiving instructional data from a driver of the hybrid vehicle.

54. The energy control unit of claim 53, wherein the instructional data includes a programmed seat position of the driver of the hybrid vehicle.

55. The energy control unit of claim 53, wherein the instructional data includes a request for directions to a destination from the driver of the hybrid vehicle, and the terrain prediction unit is operable to select one of the stored routes which may direct the driver of the hybrid vehicle to the destination.

* * * * *